(12) United States Patent
Peppe et al.

(10) Patent No.: US 9,081,106 B2
(45) Date of Patent: *Jul. 14, 2015

(54) POWER CONVERTER AND ELECTRODE COMBINATIONS FOR ELECTROMAGNETIC SURVEY SOURCE

(75) Inventors: Oliver Peppe, West Linton (GB); Ulf Peter Lindqvist, Segeltorp (SE)

(73) Assignee: PGS Geophysical AS, Oslo (NO)

( * ) Notice: Subject to any disclaimer, the term of this patent is extended or adjusted under 35 U.S.C. 154(b) by 749 days.

This patent is subject to a terminal disclaimer.

(21) Appl. No.: 13/274,493

(22) Filed: Oct. 17, 2011

(65) Prior Publication Data

US 2013/0093426 A1 Apr. 18, 2013

(51) Int. Cl.
*G01V 3/00* (2006.01)

(52) U.S. Cl.
CPC .......................................... *G01V 3/00* (2013.01)

(58) Field of Classification Search
CPC .................................. G01V 3/12; G01V 3/17
USPC ......... 324/354, 365, 348, 357, 347, 334, 345, 324/362
See application file for complete search history.

(56) References Cited

U.S. PATENT DOCUMENTS

| | | | |
|---|---|---|---|
| 2,872,638 A | 2/1959 | Jones | |
| 4,617,518 A | 10/1986 | Srnka | |
| 7,002,350 B1 | 2/2006 | Barringer | |
| 7,187,569 B2 | 3/2007 | Sinha et al. | |
| 7,411,399 B2 | 8/2008 | Reddig et al. | |
| 7,457,193 B2 * | 11/2008 | Pramik | 367/16 |
| 7,548,486 B2 * | 6/2009 | Tenghamn | 367/20 |
| 7,602,191 B2 * | 10/2009 | Davidsson | 324/347 |
| 7,642,784 B2 | 1/2010 | Reddig et al. | |
| 7,683,625 B2 | 3/2010 | Milne et al. | |
| 7,737,698 B2 | 6/2010 | Tenghamn et al. | |
| 2006/0153004 A1 * | 7/2006 | Berg | 367/37 |
| 2006/0202697 A1 | 9/2006 | Sodal | |
| 2006/0238200 A1 * | 10/2006 | Johnstad | 324/337 |
| 2007/0229083 A1 * | 10/2007 | Tenghamn et al. | 324/347 |
| 2008/0007265 A1 * | 1/2008 | Milne et al. | 324/347 |
| 2009/0140723 A1 * | 6/2009 | Ronaess et al. | 324/202 |
| 2010/0060286 A1 | 3/2010 | Summerfield et al. | |
| 2010/0188090 A1 * | 7/2010 | Ziolkowski | 324/335 |
| 2010/0231224 A1 * | 9/2010 | Lindqvist | 324/365 |

FOREIGN PATENT DOCUMENTS

GB 2431474 A 9/2006

OTHER PUBLICATIONS

European Search Report mailed Dec. 5, 2014, regarding patent application No. 1218855.6-1559 and Patent No. 2584380, 6 pages.

* cited by examiner

*Primary Examiner* — Patrick Assouad
*Assistant Examiner* — Demetrius Pretlow

(57) ABSTRACT

A marine electromagnetic survey source includes a power cable configured to couple to a high voltage power supply at one axial end and to a head unit at the other axial end. The head unit includes equipment configured to output a lower voltage at higher current than the current imparted thereto by high voltage power supply. The head unit has an electrically conductive exterior coupled to one output terminal of the equipment. An electromagnetic antenna cable having an electrode thereon is coupled to the head unit and configured to receive the output of another terminal of the head unit equipment. In some implementations, electromagnetic fields are induced in formations by conducting current to the equipment. Marine geophysical surveys are conducted utilizing such induction of electromagnetic fields.

18 Claims, 6 Drawing Sheets

POWER CONVERTER AND ELECTRODE COMBINATIONS FOR ELECTROMAGNETIC SURVEY SOURCE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The invention relates generally to the field of marine electromagnetic geophysical surveying apparatus and methods. More specifically, the invention relates to structures for marine electromagnetic geophysical survey sources and uses thereof.

Marine electromagnetic geophysical surveying is used, among other purposes, to infer spatial distribution of electrical conductivity of rock formations below the bottom of a body of water such as a lake or ocean. The spatial distribution of conductivity is used to assist determining the presence of hydrocarbon bearing rock formations in the subsurface, potentially resulting in cost savings by better targeting drilling operations. One type of such surveying is known as "controlled source" electromagnetic surveying ("CSEM"), which generally includes inducing a time varying electromagnetic field in the subsurface formations and measuring one or more parameters related to a response of the subsurface rock formations to the induced electromagnetic field.

Devices for inducing such electromagnetic fields are generally referred to as electromagnetic "sources" and include, among other devices, spaced apart electrodes or wire coils disposed along or at the end of a cable. The cable is typically towed by a vessel in the body of water. Time varying electric current is imparted across the electrodes or through the coils, generally from a power supply located on the vessel, to induce a time varying electromagnetic field in the water and subsequently in the subsurface formations. The electrodes may be suspended at a selected depth in the water by the use of floatation devices such as buoys, or the cable itself may be neutrally or otherwise buoyant.

In some circumstances, it may be desirable to operate the electromagnetic source at a substantial distance from the tow vessel. In particular, it is desirable in some circumstances to operate the electromagnetic source proximate the bottom of the body of water or at great depth in the water. There is a need for an electromagnetic source cable system that can operate at substantial distances from the source of current and/or at substantial depth in the water.

DETAILED DESCRIPTION

Figure 1:
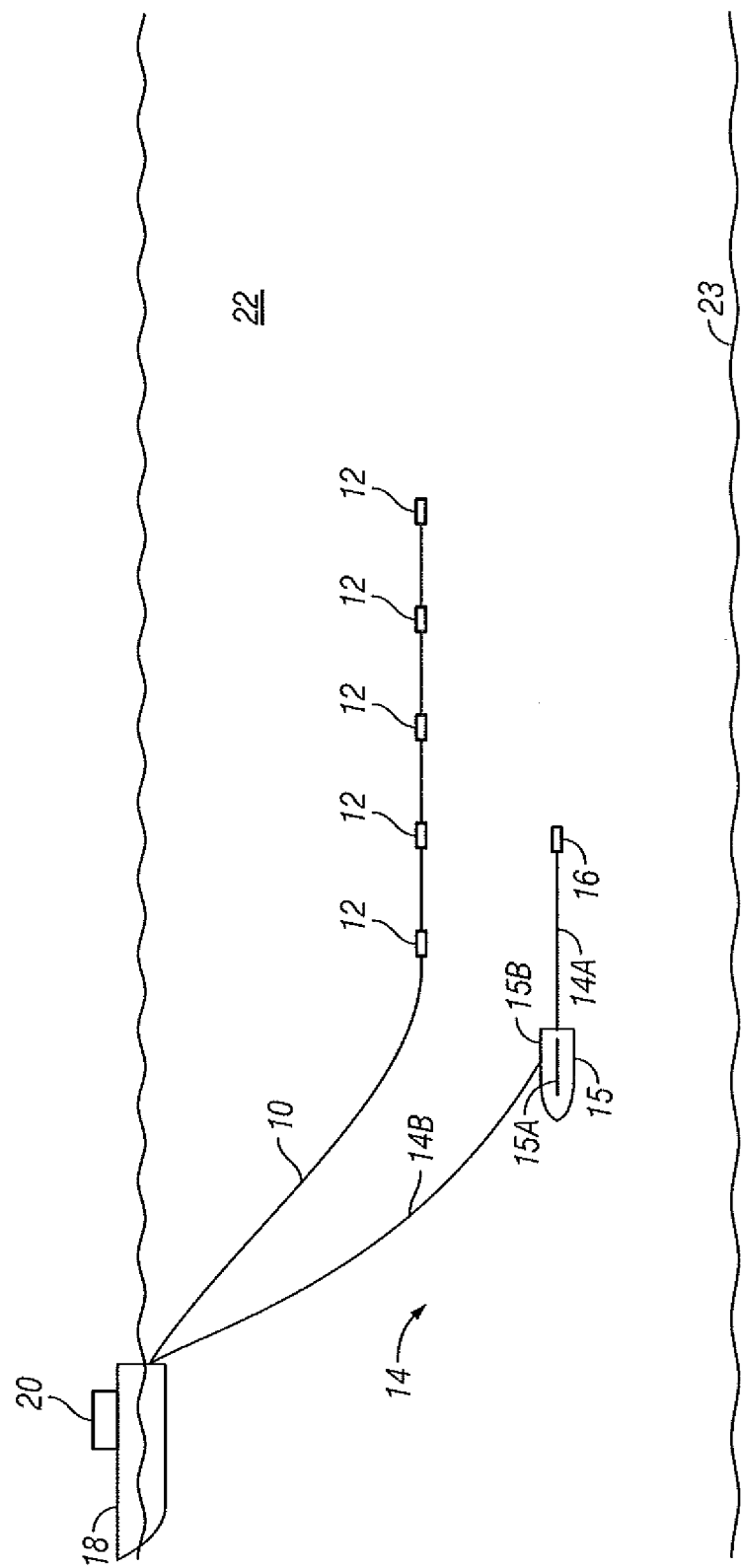
FIG. 1 shows an example embodiment of a marine electromagnetic survey system using an example embodiment of an electromagnetic source according to the invention.

An example marine electromagnetic survey system is shown schematically in FIG. 1. The marine electromagnetic survey system may include a sensor cable 10 having thereon at longitudinally spaced apart positions a plurality of sensors 12. The sensor cable 10 is shown being towed by a survey vessel 18 moving on the surface of a body of water 22 such as a lake or ocean. The sensor cable 10 may alternatively be deployed on the water bottom 23 or towed by another vessel (not shown). As another alternative, or one or more additional sensor cables may be deployed behind the survey vessel 18, behind another vessel (not shown), or on the water bottom 23. The invention may also be used with sensor nodes (not shown), e.g., static nodes disposed on the water bottom 23. The type(s) and configuration(s) of sensors 12 are not intended to limit the scope of the present invention. The sensors 12 may be used to measure the electromagnetic response of formations below the water bottom 23 to electromagnetic field(s) imparted by an electromagnetic source, as discussed below. The sensors 12 may measure one or more various electric field properties, such as voltage, magnetic field amplitude, and/or magnetic field gradient.

The survey vessel 18 may include thereon equipment, shown generally at 20 and referred to for convenience as a "recording system" that may include devices (none shown separately) for navigation, for energizing one or more electromagnetic sources for imparting an electromagnetic field in the formations below the water bottom 23, and/or for recording and processing signals generated by the various sensors 12.

The marine electromagnetic survey system shown in FIG. 1 includes an electromagnetic source which may include a source cable 14 for inducing an electromagnetic field in the formations below the water bottom 23. The source cable 14 may comprise one or more antenna cable(s) 14A, a "power" or "tow" cable 14B, and a head unit 15. The "power" or "tow" cable 14B may be coupled to the survey vessel 18 and may include insulated electrical conductors, optical fibers, and a strength member (not shown separately) to serve the purposes of conducting electrical and/or optical signals and electrical power and transmitting axial towing force from the survey vessel 18. The aft (with respect to towing direction) end of the power cable 14B may be coupled to a head unit 15. The head unit 15 may be made from a strong, dense material, such as stainless steel or the like, or fiber reinforced plastic, and may have a weight in water selected so as to be negatively buoyant. In some embodiments, the head unit 15 may cause the aft end of the power cable 14B to be submerged to a selected depth in the water depending on the amount of power cable extended from the survey vessel 18. The shape of the head unit 15 may be hydrodynamically efficient to reduce its resistance to motion in the water. The head unit 15 may define a pressure resistant interior space (as in the example illustrated in FIG. 2) wherein certain equipment (to be explained below with reference to FIG. 2) may be disposed. The equipment disposed in head unit 15 may include, for example power conversion and/or switching circuits. The head unit 15 may also include control surfaces 15A to provide upward or downward thrust under motion. For example, downward thrust under motion may resist lifting of the head unit 15 from the selected depth by the action of friction in the water as the survey vessel 18 moves the power cable 14B. Such control surfaces 15A may be fixed or may be rotatable, and may be autonomous or remotely controlled. Example embodiments of controls and mechanisms that may be used to operate the control surfaces 15A are shown in U.S. Pat. No. 7,457,193 issued to Pramik and incorporated herein by reference As will be explained below, the marine electromagnetic survey system of the present invention may also be used with a fixed position electromagnetic source antenna. In such cases, connection of the head unit 15 to a power supply may be made using a power cable which performs substantially the same electrical function as the "power" or "tow" cable 14B in FIG. 1, but which is not coupled to a survey vessel or other towing vessel.

In the present example embodiment, a forward (with respect to direction of travel of survey vessel 18) end of the antenna cable 14A may be coupled to the head unit 15. The antenna cable 14A may be an electrically insulated, single conductor cable connected to an electrode 16 disposed at a selected position along the antenna cable 14A. The head unit 15, if made from electrically non-conductive material is preferably at least partially covered with an electrically conductive material jacket or skin, as shown at 15B. Examples of such material may include, without limitation stainless steel alloy 316, MMO coated titanium, or copper. If a covering of electrically conductive material in the form of a skin or jacket is used, depending on the selected material the skin or jacket 15B may require replacement at certain times. The design of the head unit 15 may be such that replacement of the jacket 15B is facilitated. The head unit 15, or jacket 15B if used, may be electrically connected to one output terminal of a power converter (30 in FIG. 2) disposed inside the head unit 15, thus causing the head unit to act as one electrode of a bipole electromagnetic source antenna. The head unit 15 and the electrode 16 on the antenna cable 14A may be energized, for example at selected times, or continuously by a high voltage power supply 28. The voltage from the high voltage power supply 28 is converted by the power converter circuits in the head unit 15. (see FIG. 2). Energizing head unit 15 and the electrode 16 on the antenna cable 14A may induce a time varying electromagnetic field in the formations below the water bottom 23. The high voltage power supply 28 may provide alternating current ("AC") or direct current ("DC") at a voltage selected to minimize power loss along the length of the power cable 14B.

The current applied across the bipole source antenna may be alternating current ("AC") or switched direct current ("DC") (e.g., switching current on, switching current off, reversing current polarity, or sequential switching such as a pseudorandom binary sequence). The configuration shown in FIG. 1 induces a horizontal dipole electric field in the subsurface when the antenna (consisting of head unit 15 and electrode 16) is energized by the electric current. It is entirely within the scope of the present invention to induce vertical dipole electric fields in the subsurface. The type of current used to energize the electrodes is not limited to the foregoing as the invention is applicable to use with both frequency domain (continuous wave) and transient induced electromagnetic fields.

In some embodiments, the antenna cable 14A may be substantially neutrally buoyant so that the antenna cable 14A operates at substantially the same depth in the water as the head unit 15. For example, the antenna cable 14A may operate as close as about 100 m or as even as close as about 50 m to the seabed. In some embodiments, the antenna may operate at a water depth of about 50 m to about 3000 m or more.

Figure 1A:
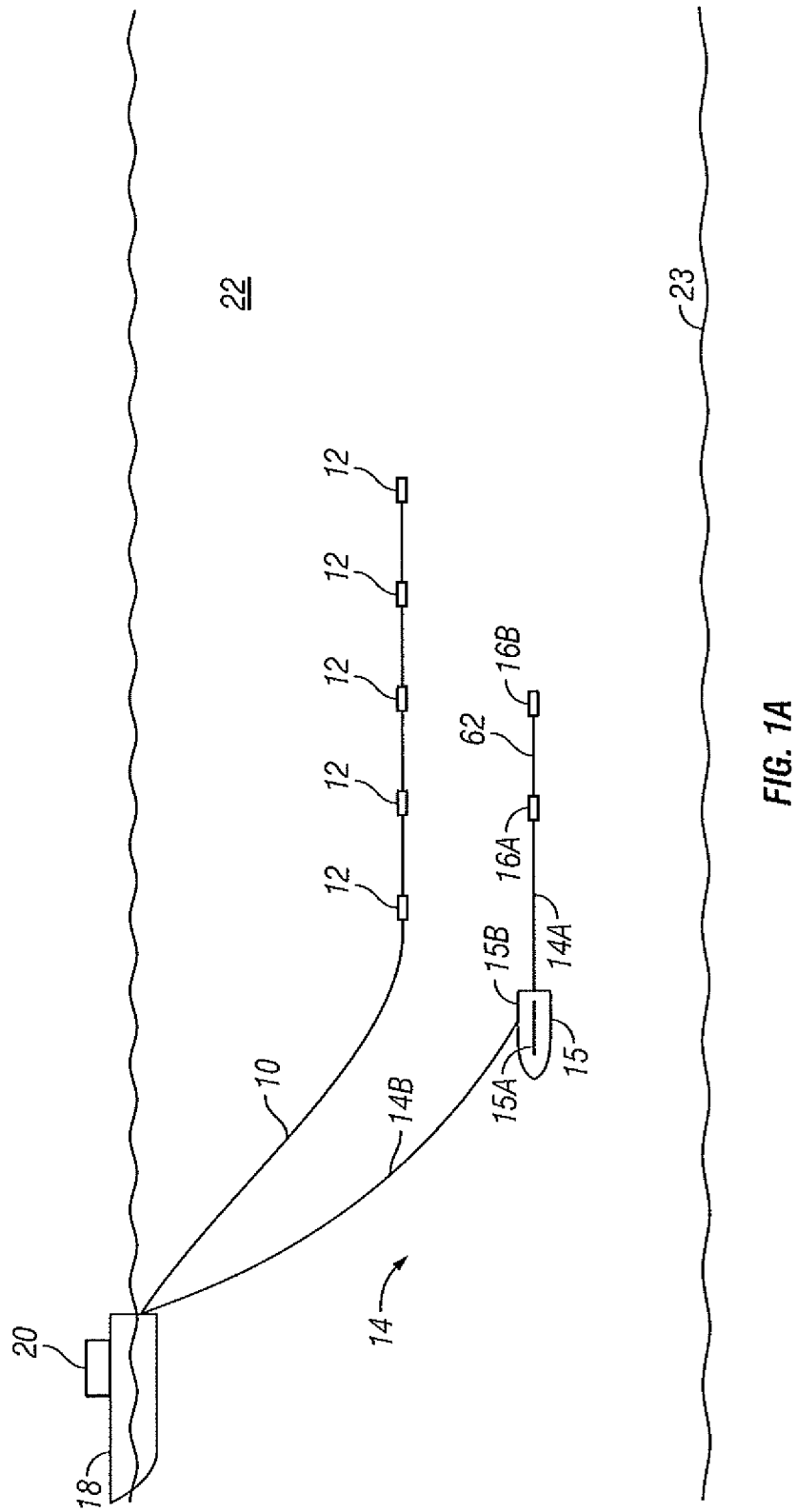
FIG. 1A shows another example embodiment of a marine electromagnetic survey system.

In some embodiments, such as shown in FIG. 1A, the antenna cable 14A may include more than one electrode, e.g., a forward electrode 16A and an aft electrode 16B connected longitudinally by a linking cable 62. In such example embodiments, the energizing circuits (FIG. 2) in the head unit may make selectable electrical connection of one output terminal of the energizing circuits to either the forward electrode 16A (with reference to the towing direction) or the aft electrode 16B so as to enable selecting a length of the source bipole.

Figure 1B:
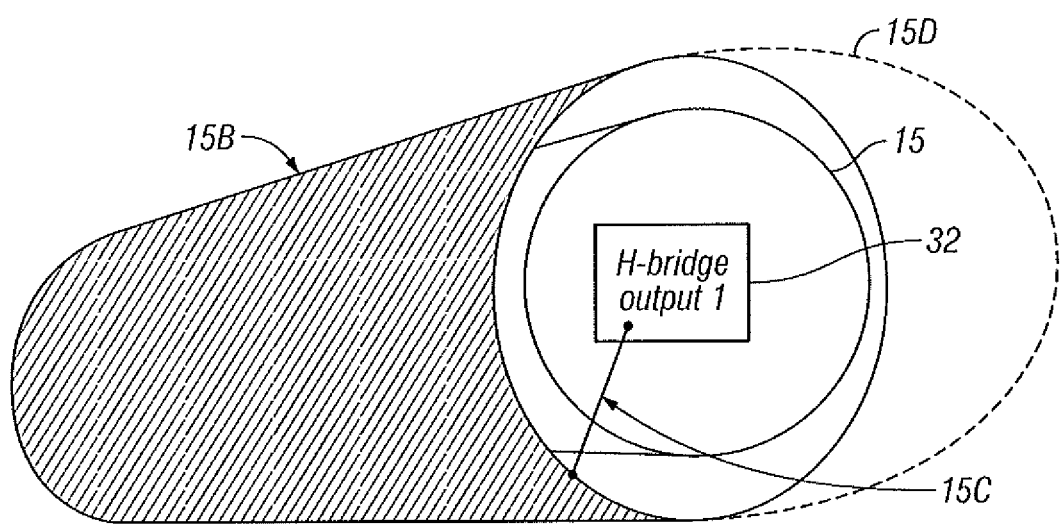
FIGS. 1B and 1C show two different possible embodiments of a head unit used in embodiments of marine electromagnetic survey systems.
Figure 1C:
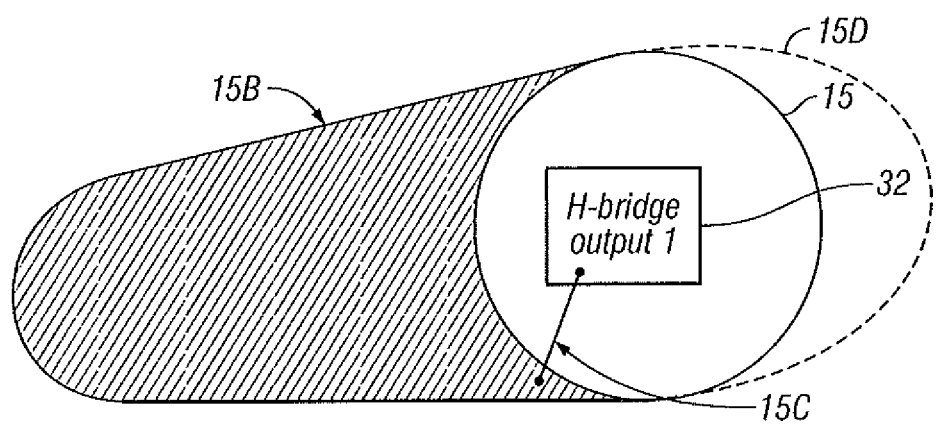

Two possible embodiments are shown in FIGS. 1B and 1C to illustrate the principle of using the head unit as an electrode in an electromagnetic source. In FIG. 1B, the housing 15 may be made from electrically non-conductive material, and may contain circuits including a switch 32 such as an H-bridge (explained further below with reference to FIG. 2). One output terminal of the switch 32 may be electrically connected to a conductive covering or skin 15B disposed on part or all of the housing 15. Another possible embodiment is shown in FIG. 1C, in which the housing 15 is made from electrically conductive material, and is electrically connected to the switch 32 terminal as in FIG. 1B.

FIGS. 1B and 1C are shown to illustrate the difference between having the outer surface of the power conversion equipment housing 15 perform the function of the conductive element (15B in FIG. 1) and just having an additional conductive surface around the power conversion equipment housing 15 to act as the electrode (15B in FIG. 1. The shape of the housing for electrical purposes is immaterial; specific shapes thereof may be configured to reduce resistance to movement in the body of water and/or to reduce turbulence caused by such movement, but any shape will performed the electrode function. Cylinders are shown in FIGS. 1B and 1C because this particular shape has been used in previous electrode designs. Such cylinders may include a hemispherical nose cone 15D on the forward end. Also the power conversion equipment is likely to be contained in a pressure vessel which may be cylindrical because that is a desirable shape for resistance to hydrostatic pressure.

Figure 2:
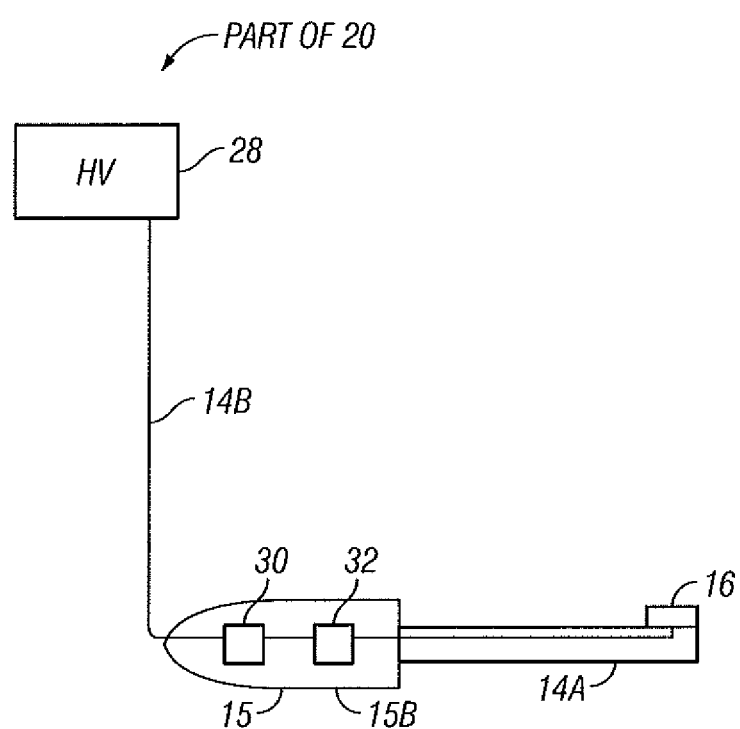
FIG. 2 shows an example embodiment of electromagnetic source circuits according to the invention.

An example embodiment of equipment disposed on the vessel (e.g., in recording system 20) and along the source cable 14 will be explained with reference to FIG. 2. The recording unit 20 may include a high voltage power supply 28 as explained above. The high voltage power supply 28 may be a DC generator, or it may be an AC generator with or without a step up transformer. Alternatively the high voltage power supply 28 may be a motor-generator set or a synchronous converter. The voltage output by the high voltage power supply 28 may be selected so that a selected amount of electrical power may be transmitted along the power cable 14B, while minimizing resistive losses along the power cable 14B. The selected amount of power may be the amount needed to generate a suitable amplitude electromagnetic field in the formations below the water bottom (23 in FIG. 1). In some embodiments, the selected amount of power may be in the range of about 100 kW to 1000 kW or more. In the present embodiment, the head unit 15 may include power conversion and switching circuits. For example, as illustrated in FIG. 2, the head unit 15 may include a power converter 30 and an H-bridge or similar switch 32. In the present embodiment, power converter 30 may be a DC to DC power converter, or an AC to DC power converter. The power converter 30 in such example embodiment may convert the high voltage from the power cable 14B to a low voltage, high current DC for energizing the head unit 15 (or jacket 15B in FIG. 1) and the electrode 16. The preferred output voltage of the power converter 30 will depend upon factors such as the spacing between the head unit 15 and the electrode 16 and the electrical conductivity of the water (22 in FIG. 1). Switch 32 may be interposed in the electrical connection between the power converter 30, and the head unit 15 and electrode 16. The switch 32 may be controlled by the recording unit 20 or may be remotely programmed to operate autonomously. The switch 32 may cause the current output from the power converter 30 to be applied to the head unit 15 (or jacket 15B) and the electrode 16 in one or more switching sequences referenced to a time index, including switching on, switching off, reversing polarity and a multiple event switching sequence, for example and without limitation, a pseudorandom binary sequence (PRBS).

In other embodiments, the equipment disposed in the head unit 15 may include a waveform synthesizer (not shown separately) to generate AC output at one or more selected frequencies and/or waveforms, or may directly use converted voltage AC from the high voltage power supply 28.

If used in an example embodiment such as shown in FIG. 1A, the switch 32 may also be configured to selectively connect one terminal of the power converter to either the forward electrode 16A or the aft electrode 16B.

Figure 3:
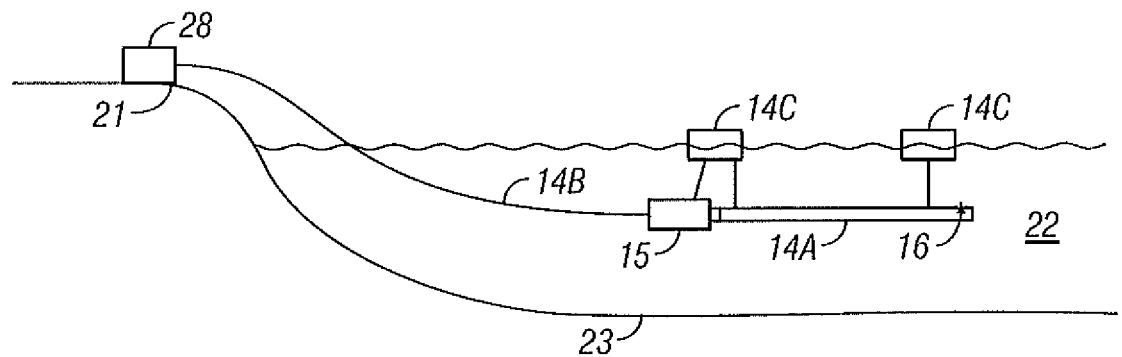
FIG. 3 shows an example embodiment of electromagnetic source having a high voltage power supply disposed on shore, while the electromagnetic source is located in the water at a selected distance from the shore.
Figure 4:
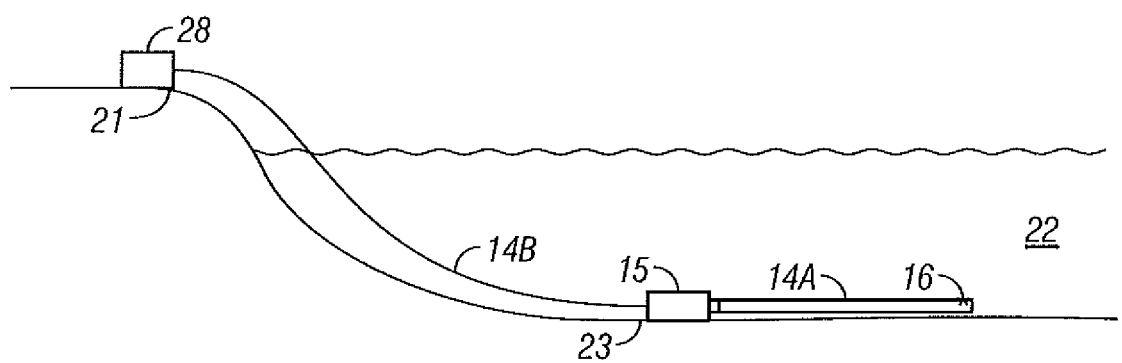
FIG. 4 shows an example embodiment similar to that in FIG. 3 wherein the electromagnetic source is disposed on the water bottom.

The foregoing marine electromagnetic survey system, while explained in terms of an electromagnetic antenna towed from a vessel, alternatively may be used to many of the same possible advantages with a fixed position electromagnetic source antenna located at a substantial distance from the high voltage power supply 28. In such embodiments, the high voltage power supply 28 may be disposed other than on a vessel, for example operated from onshore or from a rig. An example embodiment having a high voltage power supply 28 disposed on shore 21 is shown in FIG. 3. The power cable 14B is extended from the high voltage power supply 28 into a body of water 22 to a selected distance from the shore 21. The head unit 15 and antenna cable 14A may be configured substantially as explained herein. In the present example embodiment, the antenna cable 14A and the head unit 15 may be suspended at a selected depth in the water 22 using buoys, floats or any similar device, shown generally at 14C. Alternatively, the head unit 15, antenna cable 14A and electrode 16 may be disposed on the water bottom as shown in FIG. 4.

Figure 5:
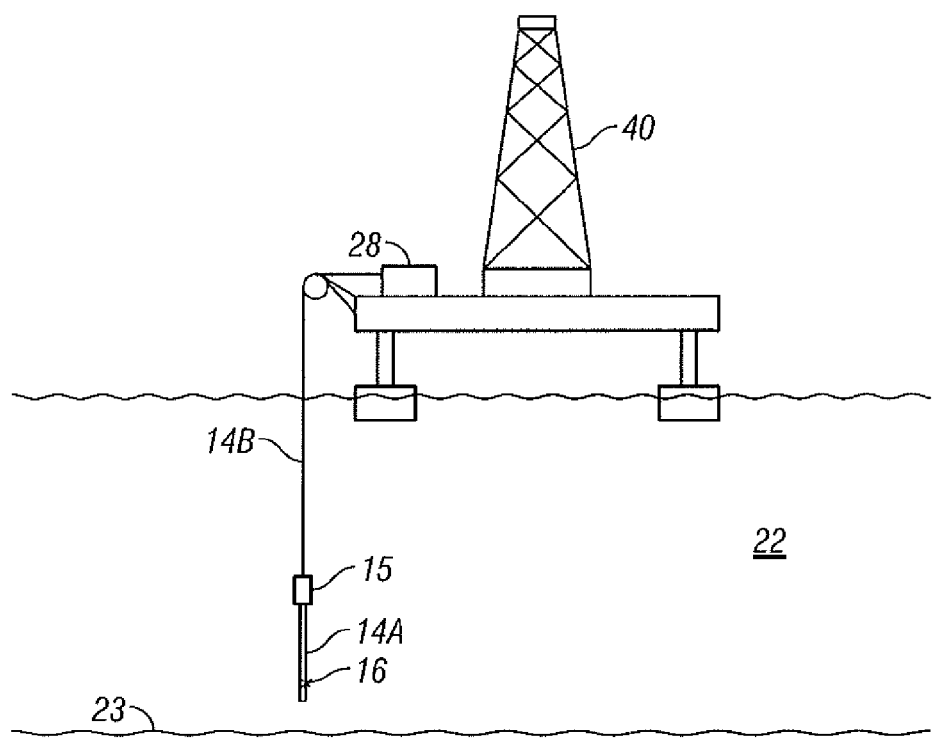
FIG. 5 shows an example embodiment of an electromagnetic source having a high voltage power supply disposed on a drilling or production platform, wherein the source is suspended in a body of water.

FIG. 5 shows an example embodiment of a high voltage power supply 28 disposed on a drilling or production platform 40. In the present example, the drilling or production platform 40 may be semisubmersible as shown, however bottom supported platforms may be used in other embodiments. The power cable 14B may extend from the high voltage power supply 28 to a selected depth in the water 22. The head unit 15 may be coupled to the end of the power cable 14B. The antenna cable 14A may be coupled to the head unit 15 as previously explained herein, wherein an electrode 16 is disposed on the antenna cable 14A and is electrically connected to the circuits in the head unit 15 as explained with reference to FIG. 2. The example shown in FIG. 5 may include having the head unit 15 and antenna cable 14A suspended at a selected depth in the water 22. Another example, shown in FIG. 6, may include extending the power cable 14B so that the head unit 15, antenna cable 14A and electrode 16 may rest on the water bottom 23.

Figure 6:
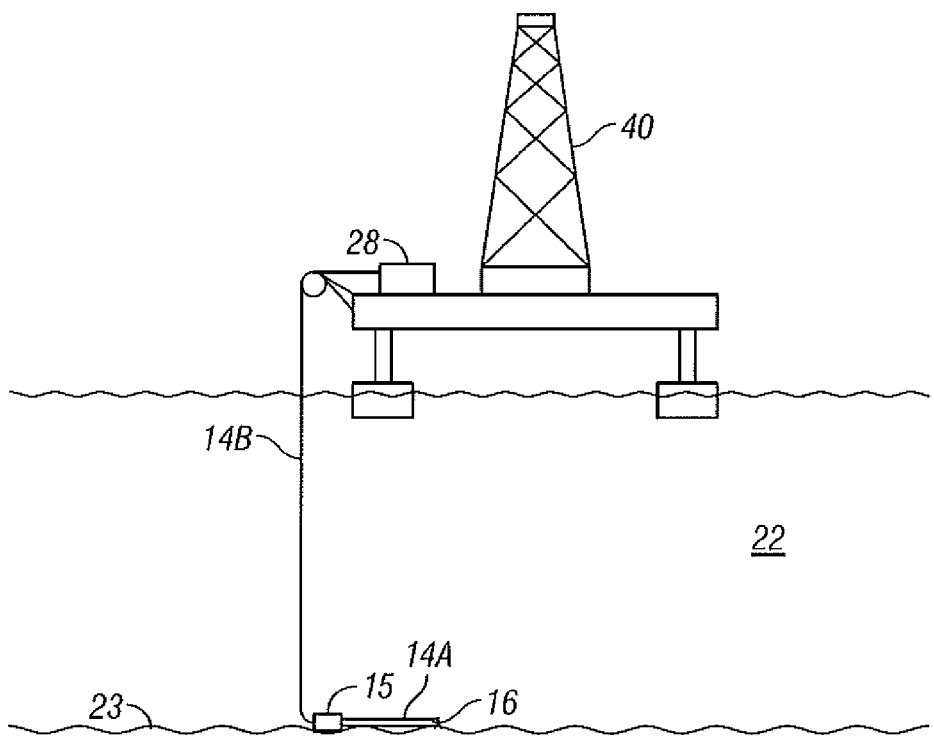
FIG. 6 an example embodiment similar to that shown in FIG. 5 wherein the electromagnetic source is disposed on the water bottom.

For such purposes as the example embodiments shown in FIG. 5 and FIG. 6, the "power" or "tow" cable indicated at 14B in FIG. 1 may not include strength members for transmitting axial towing force from the survey vessel 18, but may still provide for conducting electrical or optical signals and/or power.

Some advantages of a combining an electrode with a head unit enclosing power converter equipment may include one or more of the following. Complexity may be reduced as there are fewer bodies to tow and handle. Any reduction in the complexity of the system being towed in deep water may provide an advantage as it may reduce risk of tangling and snagging. Source deployment, recovery and handling on the deck of the vessel may be more efficient and safer. Shielding of the control electronics may be provided because the electrode surface (the skin if used or the conductive metal housing), being at equipotential, will act as faraday cage, and so electric and/or magnetic field strengths inside the housing will be minimal. This feature may avoid potential concerns about susceptibility of the control system in the housing to the electromagnetic field induced by the source. In some embodiments, there may be a shorter total length of high current source cable (i.e., between electrodes) and therefore less power dissipated in such cables. Any reduction in such power loss may result in more efficient system operation, meaning that there may be either potential for higher source signal strength or reduced system size which in turn results in easier handling and lower cost. Finally, there may be two fewer high current "dynamic" connectors. Such connectors may be a weak point of any system, quite apart from being costly. Thus, a system according to the various aspects of the present invention may provide certain advantages over electromagnetic source systems known in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine electromagnetic survey source comprising:
  a power cable configured to couple to a high voltage power supply at one axial end and to a head unit at the other axial end, wherein;
    the head unit comprises equipment configured to output a lower voltage at higher current than the high voltage power supply, wherein at least a portion of the head unit's exterior is electrically conductive and coupled to one output terminal of the equipment; and
  an electromagnetic antenna cable coupled to the head unit and configured to receive the output of another terminal of the equipment, wherein the antenna cable has an electrode thereon.

2. The marine electromagnetic survey source of claim 1 wherein the head unit equipment comprises a direct current to direct current power converter.

3. The marine electromagnetic survey source of claim 1 wherein the head unit equipment further comprises a switch configured to make selectable electric connection between the electrically conductive portion of the head unit's exterior, the electrode and the power converter.

4. The marine electromagnetic survey source of claim 1 wherein the head unit comprises a material selected to provide a predetermined buoyancy thereof and at least one control surface configured to enable operating the head unit at a selected depth in a body of water.

5. The marine electromagnetic survey source of claim 1 wherein the high voltage power supply is located on board a vessel and the power cable is configured to tow the head unit from the vessel.

6. The marine electromagnetic survey source of claim 1 wherein the equipment in the head unit comprises a switch configured to selectively apply output and selectively reverse polarity of the other terminal to the electrically conductive portion of the head unit's exterior and the electrode.

7. The marine electromagnetic survey source of claim 1 wherein the head unit further comprises a housing at least partially covered by a jacket.

8. The marine electromagnetic survey source of claim 1 wherein the high voltage power supply is a direct current power supply.

9. The marine electromagnetic survey source of claim 1 wherein the high voltage power supply is an alternating current power supply.

10. A method for inducing an electromagnetic field in formations disposed below a bottom of a body of water, comprising:
   conducting current to equipment disposed in the body of water from a high voltage power supply located away from the equipment;
   generating an output with the equipment wherein the output has lower voltage and higher current than the current imparted thereto; and
   applying the output of the equipment to at least one electromagnetic antenna disposed in the body of water, wherein
      the equipment is disposed in a head unit,
      at least a portion of the head unit's exterior is electrically conductive and coupled to one output terminal of the equipment to act as a first electrode in the at least one antenna, and
      a second electrode of the at least one antenna is disposed at a selected position along an antenna cable which is coupled to another output terminal of the equipment.

11. The method of claim 10 wherein the equipment comprises a DC to DC power converter.

12. The method of claim 10 wherein the equipment further comprises a switch configured to make selectable electric connection between the electrodes of the at least one electromagnetic antenna and the equipment.

13. The method of claim 12 wherein the output applied to the at least one electromagnetic antenna is in the form of switched direct current.

14. The method of claim 10 wherein the power supply is located on board a vessel, and the equipment is towed from the vessel.

15. The method of claim 10 wherein the equipment comprises an AC to DC power converter.

16. A method of marine geophysical surveying comprising:
   inducing an electromagnetic field in formations disposed below a bottom of a body of water, wherein inducing the electromagnetic field comprises:
      conducting current to equipment disposed in the body of water from a high voltage power supply located away from the equipment;
      generating an output with the equipment wherein the output has lower voltage and higher current than the current imparted thereto; and
      applying the output of the equipment to at least one electromagnetic antenna disposed in the body of water, wherein
         the equipment is disposed in a head unit;
         at least a portion of the head unit's exterior is electrically conductive and coupled to one output terminal of the equipment to act as a first electrode in the at least one antenna; and
         a second electrode of the at least one antenna is disposed at a selected position along an antenna cable which is coupled to another output terminal of the equipment; and
   measuring electromagnetic response of the formations.

17. The method of claim 16 wherein measuring electromagnetic response comprises measuring at least one electromagnetic field property comprising voltage, magnetic field amplitude, magnetic field gradient, and any combination thereof.

18. The method of claim 16 further comprising changing a bipole length of the electromagnetic antenna by including a third electrode on the antenna cable longitudinally spaced apart from the first and the second electrodes, and selectively making electrical connection between the another output terminal of the equipment and the second or third electrode.

* * * * *